(12) United States Patent
Sinclair

(10) Patent No.: US 6,490,649 B2
(45) Date of Patent: Dec. 3, 2002

(54) MEMORY DEVICE

(75) Inventor: Alan Welsh Sinclair, Edinburgh (GB)

(73) Assignee: Lexar Media, Inc., Fremont, CA (US)

( * ) Notice: Subject to any disclaimer, the term of this patent is extended or adjusted under 35 U.S.C. 154(b) by 0 days.

(21) Appl. No.: 10/085,914

(22) Filed: Feb. 28, 2002

(65) Prior Publication Data

US 2002/0103960 A1 Aug. 1, 2002

Related U.S. Application Data

(63) Continuation of application No. 09/180,577, filed on Nov. 10, 1998.

(51) Int. Cl.$^7$ .................................................. G06F 12/00
(52) U.S. Cl. .............. 711/103; 365/185.29; 365/230.03
(58) Field of Search ...................... 711/103; 365/185.11, 365/185.29, 185.33, 230.03

(56) References Cited

U.S. PATENT DOCUMENTS

| | | | | |
|---|---|---|---|---|
| 5,070,421 A | * | 12/1991 | Sumiya et al. | 360/77.07 |
| 5,459,850 A | * | 10/1995 | Clay et al. | 711/171 |
| 5,541,886 A | * | 7/1996 | Hasbun | 365/185.03 |
| 5,604,846 A | * | 2/1997 | Kadota | 358/1.16 |

* cited by examiner

Primary Examiner—Do Hyun Yoo
Assistant Examiner—Nasser Moazzami
(74) Attorney, Agent, or Firm—Gifford, Krass, Groh, Sprinkle, Anderson & Citkowski, P.C.

(57) ABSTRACT

An addressable memory device for storing blocks of varying length, utilizes a write pointer (18) to indicate the address of the next location to which data are to be written and an erase pointer (16) to indicate the address of the next location from which data are to be erased. It has a sector header (20) appended to each group of data containing information (38) indicating the length of the corresponding sector of data, and the location stored by the write pointer (14), which is selected to ensure that there is always at least one erased block adjacent to the current write block.

4 Claims, 1 Drawing Sheet

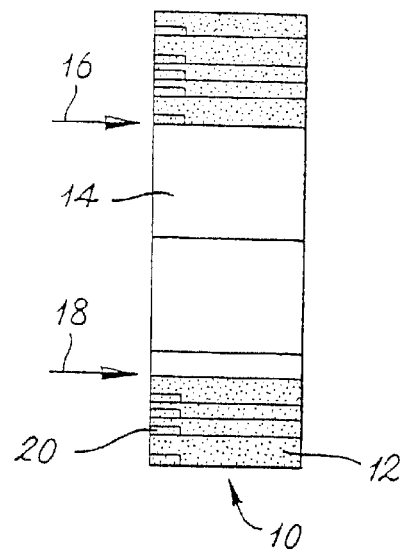
FIG: 1
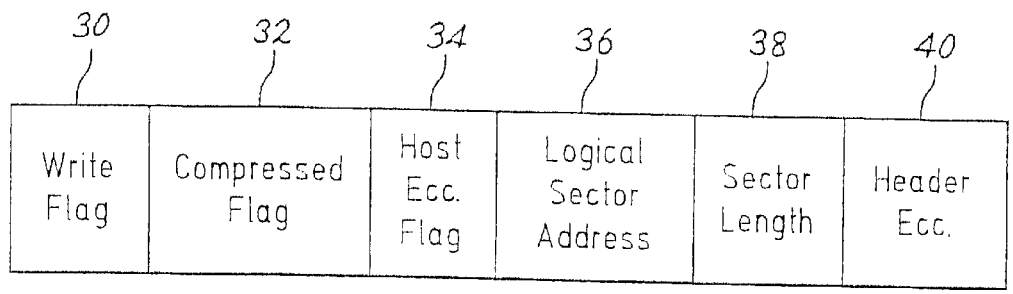
FIG: 2

MEMORY DEVICE

RELATED APPLICATIONS

This application is a continuation of U.S. patent application Ser. No. 09/180,577 filed Nov. 10, 1998, which claims priority of PCT Patent Application PCT/GB97/01241 filed May 8, 1997 and United Kingdom Patent Application No. 9609833.0 filed May 10, 1996, which are incorporated herein by reference.

FIELD OF THE INVENTION

This invention relates to electronic memory devices and, in particular, it relates to memory devices which are capable of storing data in variable length blocks.

DESCRIPTION OF THE RELEVANT PRIOR ART

Memory systems are used to store data. As data storage requirements increase memory device capacity must also increase. To avoid having to use memories that are physically large or contain a large number of cells, many memory systems incorporate data compression. Data compression is appealing because it has the advantage of increasing the amount of data that can be stored in a memory device without increasing the physical size of the memory device. A number of different data compression techniques exist. Some of these techniques are implemented by hardware others are implemented by software.

In European patent application No. EP 0436104 A2 (National Semiconductor) a data communications system with multiple ports using shared data has a transceiver with a FIFO data store. During data reception, a comparator compares a subset of the incoming data with a predetermined reference to decide whether the data should be stored or aborted. This operation sets a memory address value for a commit pointer. The first subset of data behind the commit pointer is selectively stored and the subset after the point is selectively aborted. The reason for this operation is to select data appropriate for the particular port.

In European patent application No. EP 0509722 A2 (NEC) a multiple processor system has an I/O buffer with a predetermined number of buffer areas. An external pointer stores an address corresponding to the initial position of one of the buffer areas. The address is calculated with reference to the ratio of the length of a data block to be transferred and the total length of the buffer areas.

In U.S. Pat. No. 4,297,567 (Philips) a content addressable FIFO memory in which the stored signal is addressed in a mode determined by the content of the stored signal. Instructions for processing the signal are stored in the same memory as a contiguous signal.

In U.S. Pat. No. 4,507,760 (AT&T) a FIFO memory system has an addressable cyclic store, a write pointer, a read pointer and a last-word pointer for identifying the end of a multiword message. Before a write operation a comparator checks that the write and read pointers are not at the same setting. Before reading a comparator checks that the read pointer and the last-word pointer are not at the same setting. The contents of the write pointer are copied to the last-word pointer register on receipt of an end-of-message signal. On identification of an error in a new memory word, the last word pointer is copied to the write pointer register.

In U.S. Pat. No. 5,410,308 (Deutsche Thomson-Brandt) a video signal storage system encodes pixels into variable length data words dependent on discrete cosine transformation of DC and AC components of a pixel. The encoder has an address flag to indicate whether or not a transport block contains data from segmented data blocks having a length greater than a predetermined average length and makes provision for storing such data elsewhere.

In U.S. Pat. No. 5,495,552 (Mitsubishi) an audio signal is encoded into several hierarchical levels of data corresponding to increasing levels of fidelity. After the available memory is full, recording continues by over-writing successively lower hierarchical level levels. At the conclusion a code is recorded indicating the number of hierarchical levels to be reproduced.

U.S. Pat. No. 4,942,553 (Silo) discloses that, in a FIFO memory device controlling data transfer between a microprocessor and peripheral devices, memory over-runs, with consequent loss of data, and under-runs, with consequent transmission of garbage, are obviated by having two user programmable levels for generating a notification to the DMA or co-processor when action is required.

In U.S. Pat. No. 4,271,480 (Honeywell-Bull) a FIFO store has an input and output interface with stores for input and output data words. Flags indicated when the input and FIFO stores are empty and ready to receive data. A controller sets the width of the output data words in response to an external signal.

In Japanese patent application No. 57033469 (Hitachi) increase of throughput and restriction of use of buffer memory is obtained by storing a pointer to the end of stored data. The system employs read, write and data end pointers. Writing is inhibited after the write pointer reaches the value stored in the end pointer. Erasure takes place asynchronously with reading and is controlled by the end pointer.

Implementing efficient data compression in memory systems is not simple because the files are split into a number of fixed data block sizes called sectors. If files are compressed before they are split into sectors then there is no problem because each sector except the final sector is full of compressed data. If, however, files are split into sectors before data compression is applied then the compressed sectors will not be of a standard length, they will be of variable length. That is, one sector may compress to half its original size, whereas another sector may compress to a quarter of its original size. Sectors do not all compress to a common size.

Consider the following case. A sector is compressed and stored at a memory location, a second sector is then compressed and stored in the memory location immediately adjacent to it. If the first sector is then altered it might not be compressed to the same size as before. If it is larger than it was before then it will not fit into the memory space it previously occupied; if it is smaller than it was before then there will be wasted memory space causing disk fragmentation. Disk fragmentation reduces the storage efficiency of the memory device which may offset the benefits gained by data compression.

SUMMARY OF THE INVENTION

The invention is concerned with a memory device which stores variable length data blocks such as the blocks produced by data compression of fixed length sectors.

Accordingly, the present invention provides an addressable memory device for storing data arranged in groups, said groups of data not being of a fixed length, comprising a memory, a write pointer adapted to indicate an address of the next set of locations to which data are to be written and an erase pointer adapted to indicate the address of the next location from which data are to be erased wherein a sector header is appended to each group of stored data, the location stored by the write pointer being selected to ensure that there is always at least one set of erased memory location adjacent to the set of locations indicated by said write pointer.

BRIEF DESCRIPTION OF THE DRAWINGS

An embodiment of the present invention will now be particularly described, by way of example, with reference to the accompanying drawing in which:

FIG. 1 shows a diagram of a block-erasable memory; and

FIG. 2 shows a diagram of a sector header.

DETAILED DESCRIPTION OF THE PREFERRED EMBODIMENT

FIG. 1 shows an addressable block-erasable memory 10 for storing sectors of data 12, where a sector is not of fixed length. The minimum area of memory that can be erased in an erase operation is called an erase block. The memory 10 has an erase pointer 16 which indicated the next block of memory from which data are to be erased and a write pointer 18 which indicates the next location to which data are to be written. These two pointers (16,18) are separated by at least one erase block 14 in the erased state. The erase pointer 16 points to the first sector in an erase block. The write pointer 18 points to the area of memory space to be written to, that is, the memory location immediately adjacent to the sector 12 that was most recently written. After a sector 12 is written, the write pointer 18 is incremented past the end of that sector 12. Any sectors 12 written to the memory 10 directly from a host are compressed according to the compression technique being implemented and stored at the location defined by the write pointer 18.

The pointers (16,18) cycle through the memory space ensuring that the two pointers are separated by at least one erase block 14 in the erased state. Obsolete sectors in the erase block 14 that is currently pointed to by the erase pointer 16 are not relocated; whereas any sectors in that erase block 14 containing valid data are relocated to the location currently indicated by the write pointer 18. Once all of the valid sectors in an erase block 14 have been relocated the erase block 14 is erased and the erase pointer 16 is incremented to point to the first sector 12 in the next erase block 14.

Each sector of data 12 has a sector header 20 associated with it. The sector header is used to indicate how long the sector is and to store control information relating to the sector. The sector header 20 contains a number of fields, as shown in FIG. 2.

A write flag 30 consists of one bit which is used to show whether or not data have been written to the sector 12. The write flag 30 is set when a sector of data is written and is cleared whenever an erase block 14 is erased. A compressed flag 32 is a single data bit which is used to indicate whether or not the data in the sector 12 are compressed. The compressed flag 32 is set when the sector data are compressed. A host error correction code (ECC) flag 34 is used when an ECC for a sector is transmitted with the sector data from the host.

A logical sector address field 36 is composed of a plurality of data bits. The logical sector address field 36 is used to store the logical sector address as defined by the host. The logical sector address is the address generated by the host. The number of bits required for the logical sector address 36 will depend on the physical size of the memory.

A sector length field 38 is used to indicate the length of the sector data stored in the block-erasable memory 10. There may also be a header ECC field 40 for providing a means of checking the integrity of the data stored in the sector header 20.

By reading the sector header field 20 the write pointer 18 can calculate where the end of the sector will be. Every time a sector is altered it is relocated so that the sector starts at the memory location adjacent to the sector that was written most recently. Since there is always at least one erase block 14 in the erased condition adjacent to the write pointer 18, a data sector 12 can always be written at the location defined by the write pointer 18. Thus the present invention ensures that data compression techniques can be used efficiently with block erasable memories.

In the above embodiment, the sector length field, which is included in the header defines the logical length of the sector and that logical length may change if data compression is used. In an alternative embodiment the sector length field stores the physical length of the sector. The physical length may vary for two reasons, firstly, if the logical length is variable, perhaps because of data compression and secondly, to accommodate defective memory locations. If a sector spans both good and defective memory regions, the physical length must be altered to take account of the extra addresses which must be allocated because faulty memory can not be accessed.

It will be appreciated that various modifications may be made to the above described embodiment within the scope of the present invention. Some embodiments of the present invention may not use any form of error checking or correction codes.

What is claimed is:

1. An addressable electronic memory device for storing data which is arranged in data groups, said data groups not being of a fixed length, said data groups being delivered to the memory device by a host, the memory device comprising:

a plurality of memory blocks, each memory block having a plurality of addressable data-storage locations, each of said plurality of data-storage locations being individually addressable for storage of data therein, and all data-storage locations within any one of the memory blocks being erasable together to form an erased block;

an erase pointer operative to indicate a first location address within a first block to be erased, and when erasure of said first block has been completed, to indicate a first location address within a next block to be erased; and a write pointer which is separated from the erase pointer by at least one block in an erased state, with every data-storage location between the write pointer and the erase pointer being in an erased state prior to a write operation;

wherein data is written as a data group to a set of contiguous locations, the first of said set being indicated by the write pointer and after the write operation, the write pointer is incremented through the set of contiguous locations to a next free location to await the next write operation, each data group being written with a sector header which stores control information for the data group, the length of the data group and an origination address for the data group as determined by the host.

2. An addressable electronic memory device as claimed in claim 1, wherein the control information of each sector header contains means for indicating whether or not the respective data group has been compressed.

3. An addressable electronic memory device as claimed in claim 1, wherein the control information of each sector header contains means for one of correcting and checking data bits in the respective sector header.

4. An addressable electronic memory device as claimed in claim 1, wherein the addressable memory device forms part of a computer system.

* * * * *